| United States Patent [19] | [11] Patent Number: 4,752,340 |
| --- | --- |
| Brand et al. | [45] Date of Patent: Jun. 21, 1988 |

[54] TITANIUM DIOXIDE PIGMENTS

[75] Inventors: John R. Brand, Oklahoma City; Phillip M. Story, Yukon, both of Okla.

[73] Assignee: Kerr-McGee Chemical Corporation, Oklahoma City, Okla.

[21] Appl. No.: 6,873

[22] Filed: Jan. 27, 1987

[51] Int. Cl.$^4$ ................................................. C09C 1/36
[52] U.S. Cl. .................. 106/300; 106/308 R; 106/308 N
[58] Field of Search ................ 106/300, 308 R, 308 N

[56] References Cited

U.S. PATENT DOCUMENTS

| 2,032,827 | 3/1936 | Andrews | 83/46 |
| 2,219,011 | 10/1940 | Kidwell et al. | 83/46 |
| 3,015,573 | 1/1962 | Myers et al. | 106/300 |
| 3,172,772 | 3/1965 | Rowe | 106/300 |
| 3,506,466 | 4/1970 | Bramekamp et al. | 106/300 |
| 3,825,438 | 7/1974 | Pritchard et al. | 117/100 B |
| 4,075,031 | 2/1978 | Allen | 106/300 |
| 4,177,081 | 12/1979 | DeColibus | 106/300 |
| 4,318,843 | 3/1982 | Köhler et al. | 106/300 |
| 4,318,844 | 3/1982 | Köhler et al. | 106/300 |
| 4,405,376 | 9/1983 | Matsunaga et al. | 106/308 N |
| 4,447,271 | 5/1984 | Howard et al. | 106/300 |
| 4,461,810 | 7/1984 | Jacobson | 106/300 |

*Primary Examiner*—Paul Lieberman
*Assistant Examiner*—Willie J. Thompson
*Attorney, Agent, or Firm*—William G. Addison; John P. Ward

[57] ABSTRACT

There are provided titanium dioxide pigments characterized by improved gloss developing and dispersibility properties in surface coating vehicles and reduced tendencies to adsorb moisture. Said titanium dioxide pigments comprise pigmentary titanium dioxide particles having deposited thereon a treating agent comprising at least one amine salt of a polyprotic acid having $pK_{a1}$ value greater than about 2.5 and a water solubility at 20° C. of at least 2.0 weight percent and an alkanolamine having a $pK_{b1}$ greater than about 4.4.

18 Claims, No Drawings

TITANIUM DIOXIDE PIGMENTS

FIELD OF THE INVENTION

The present invention relates to titanium dioxide pigments characterized by their improved gloss developing and dispersibility properties in surface coating vehicles and by their reduced tendencies to adsorb moisture. More specifically, the present invention relates to pigmentary titanium dioxide particles having adsorbed on the surfaces thereof a treating agent comprising an amine salt of a water soluble polyprotic acid and an alkanolamine.

BACKGROUND OF THE INVENTION

Pigmentary titanium dioxide is the most widely used white pigment in commerce today. Its preeminence is due, in the main, to its extraordinary combination of properties including little or no adsorption of visible light, high refractive index, high opacity and the ability to confer durability to coatings containing this pigment. However, regardless of the preeminence of this pigment much effort has been and continues to be expended to further improve its performance. This particularly is true with regard to efforts to reduce the pigment's tendency to adsorb moisture and to improve its gloss developing and dispersibility characteristics.

Many proposals have been made in the art for improving the gloss developing and dipersibility characteristics of pigmentary titanium dioxide. In general, these proposals have involved the treatment of the pigment with a diversity of organic substances of various descriptions. For example, U.S. Pat. No. 3,015,573 discloses the treatment of dry titanium dioxide pigments with amine salts prepared from water soluble tertiary amines such as triethanolamine with sparingly water soluble organic acids such as adipic acid. According to this patent, the use of sparingly water soluble organic acids, i.e., acids having water solubilities in the range of from 0.05 to 2.0 weight percent, to prepare the amine salt treating agents is essential if pigments that are more readily dispersible in both organic and aqueous media are to be obtained, a major objective of the invention of this patent. In addition to being more readily dispersible, the pigments described in this patent are said to exhibit a greater tendency to dry flow and to form as few as 20 percent of the oversize aggregates which said pigment would otherwise form. The other principal physical properties, e.g., oil adsorption, color, gloss and the like are substantially unaffected and remain substantially those of the corresponding pigments without the amine salt.

In a similar manner, U.S. Pat. No. 3,506,466 discloses the chemical treatment of pigmentary titanium dioxide to improve its dispersibility. According to this patent, amine salts prepared from alkanolamines such as triethanolamine, triisopropanolamine, and the like and oxycarboxylic acids such as citric acid, tartaric acid, and the like are capable of improving the dispersibility of pigmentary titanium dioxide as well as other properties thereof including tinting strength and scattering coefficient. The amine salts are applied either in pure form or dissolved in water and added to an aqueous slurry of the pigment. The slurry then is dried and the dried pigment subjected to fluid energy milling.

U.S. Pat. No. 3,825,438 discloses the coating of titanium dioxide pigment with one or more hydrous metal oxides in the presence of a polyhydric alcohol and/or a carboxylic acid. The alcohols and/or the acids useful in the practice of the invention of this patent are those that contain at least two hydroxyl groups, which term is defined to include the hydroxyl groups present in the carboxyl groups of the acids. In accordance with the teachings of this patent, while the alcohols and/or acids can be added to the titanium dioxide pigment at any convenient stage, it is essential that such addition be accomplished prior to completion of the deposition of the hydrous metal coating. The resulting pigment is said to have improved dispersibility when compared with a pigment coated in the absence of these alcohols and/or acids. In addition, such treatment is said to further improve one or more of the gloss, hiding power, stoving color and drying time of the pigment produced using this treatment.

A treatment specifically directed to improving the gloss developing properties of titanium dioxide pigment is disclosed in U.S. Pat. No. 3,173,722. According to the disclosure in this patent, the gloss developing properties of titanium dioxide pigments are improved by treating a wet milled hydrous metal oxide coated titanium dioxide pigment with a combination of either benzoic or para-aminobenzoic acid and an amine such as triethanolamine. The treatment merely comprises adding the acid and amine to the pigment and, without removing these materials from the pigment, milling the pigment to produce a finely divided, high tinting strength material having greatly improved gloss developing properties.

It is evident from the above art disclosure that many different chemical treatments have been proposed to improve various physical properties of titanium dioxide pigments. This is particularly true with respect to improving the dispersibility and dry flow characteristics of titanium dioxide pigment. However, many of the chemical treatments proposed would appear to be specific for improving only that property of the pigment which it is desired to improve. At best, other properties remain substantially the same as the corresponding untreated pigment or, at worse, are adversely effected by the treatment.

The present invention is directed principally to the chemical treatment of titanium dioxide pigments to improve the dispersibility of the pigment in surface coating vehicles. Surprisingly, however, the pigments so treated further exhibit significantly improved gloss developing properties and reduced tendencies to adsorb moisture.

SUMMARY OF THE INVENTION

The present invention relates to titanium dioxide pigments having improved dispersibility and gloss developing properties in surface coating vehicles and reduced tendencies to adsorb moisture. Particularly, the titanium dioxide pigments of this invention comprise pigmentary titanium dioxide particles having adsorbed on the surface thereof, a treating agent comprising at least one amine salt of a polyprotic acid having a $pK_{a1}$ value greater than about 2.5 and a water solubility at 20° C. of at least 2.0 weight percent and an alkanolamine having a $pK_{b1}$ value greater than about 4.4.

The invention further relates to a method for treating titanium dioxide pigments with said amine salts to provide the improved titanium dioxide pigments of the invention.

DETAILED DESCRIPTION OF THE INVENTION

The present invention arises from the discovery that alkanolamine salts produced from the polyprotic acids and alkanolamines described immediately hereinbelow will, when applied to the surface of a titanium dioxide pigment, impart to said pigment improvements in certain of the physical properties thereof. These improvements include an increase in the dispersibility of said pigment in a surface coating vehicle, an increase in the gloss developing properties of said pigment and a reduction in the tendency of said pigment to adsorb moisture. These improvements are obtained whether the pigment undergoing treatment is a bare or noncoated pigment or a coated pigment, i.e., a pigment having one or more materials such as the known hydrous oxides of the metals aluminum, titanium, zirconium, cerium, silicon, zinc, and the like deposited thereon.

The amine salts which can be used to prepare the improved titanium dioxide pigments of this invention are those amine salts produced by the reaction of certain organic and inorganic polyprotic acids with certain primary, secondary and tertiary alkanolamines. The organic and inorganic polyprotic acids which can be used to produce the amine salt are those acids, and the anhydrides thereof, selected from the group consisting of aliphatic (both saturated and unsaturated), alicyclic and aromatic polycarboxylic acids and boric acid wherein said acids have $pK_{a1}$ values greater than about 2.5 and water solubilities of at least 2.0 weight percent measured at a temperature of 20° C. Representative, but nonlimiting, examples of the acids useful in preparing the amine salts employed to produce the improved titanium dioxide pigments of this invention include acids such as malonic acid, succinic acid, succinic anhydride, methyl succinic acid, glutaric acid, pimelic acid, tricarballylic acid, aconitic (or citridic) acid, phthalic acid, phthalic anhydride, trimellitic acid, trimellitic anhydride, and the like; and boric acid which is believed to exist as the trimer in solution. Preferred acids useful in preparing the amine salts employed to produce the improved titanium dioxide pigments of this invention are saturated aliphatic dicarboxylic acids and aromatic acids. The most preferred acids of these groups of acids are malonic acid, succinic acid and phthalic acid.

The alkanolamines useful in preparing the amine salts employed to produce the titanium dioxide pigments of this invention include primary, secondary and tertiary alkanolamines corresponding to the general formula

wherein $R_1$, $R_2$ and $R_3$ represent hydrogen, unsubstituted hydrocarbon radicals and hydrocarbon radicals substituted with at least one substituent group selected from amino and hydroxyl groups provided, however, that at least one of said $R_1$, $R_2$ and $R_3$ will be a hydrocarbon radical substituted with a hydroxyl group. Specifically, the hydrocarbon radicals, both unsubstituted and substituted, represented by $R_1$, $R_2$ and $R_3$ are those hydrocarbon radicals selected from the group consisting of alkyl radicals, including straight- and branched-chain alkyl radicals, cycloalkyl radicals and aromatic radicals. Preferred alkanolamines corresponding to the above general formula are those wherein at least one of said $R_1$, $R_2$ and $R_3$ is an alkyl radical containing 2 to 3 carbon atoms and substituted with a hydroxyl group.

Representative, but nonlimiting, examples of alkanolamines corresponding to the above general formula are mono-, di- and triethanolamine, aminoethylethanolamine, ethyldiethanolamine, phenylethanolamine, mono-, di- and triisopropanolamine, dimethylisopropanolamine, N-(2-hydroxypropyl)-ethylenediamine, di(2-ethylhexyl)ethanolamine and the like. The most preferred alkanolamines for use in preparing the amine salts employed in this invention are the various mono-, di- and triethanolamines and the mono-, di- and triisopropanolamines.

The amine salts employed to produce the improved titanium dioxide pigments of the present invention can be used as preformed solutions or they can be formed in situ in the presence of the pigment to be treated. When this latter procedure is employed, one more convenient means for accomplishing the formation of the amine salt and its adsorption by the pigment is by metering the pigment, the desired polyprotic acid and alkanolamine into a grinding apparatus known as a fluid energy mill. Examples of such mills are disclosed in U.S. Pat. No. 2,032,827 and U.S. Pat. No. 2,219,011. In using such mills, the pigment is introduced as a jet into a stream of superheated steam circulating through the mill at extremely high velocities whereby the pigment particles are entrained in said steam and caused to collide with each other with great force. The small amounts of the polyprotic acid an alkanolamine required to produce the amine salt either can be metered directly into the mill or into the pigment stream as said stream enters the mill. The collisions which occur between the pigment particles within the mill spread the polyprotic acid and alkanolamine uniformly over the surface of the colliding particles whereon the polyprotic acid and alkanolamine react to form the desired amine salt.

Generally, the amine salts disclosed hereinabove and used to prepare the improved titanium dioxide pigments of this invention will be employed in the form of preformed solutions. A preformed solution is prepared simply by adding the desired quantity of the polyprotic acid and alkanolamine to a suitable solvent. Such sovlent can be any organic liquid or, preferably, water. This preformed solution then is added to the pigment in any convenient manner including adding the solution to a slurry of the pigment, spraying the solution onto the pigment or metering the preformed solution into a fluid energy mill for treatment of the pigment therein in a manner similar to that discussed above.

Whether employed as a preformed solution or formed in situ during the milling of the pigment to be treated with the amine salt, the amounts of polyprotic acid and alkanolamine used to form the amine salt will be amounts sufficient to produce an amine salt that is essentially neutral (i.e., having a pH of from about 6.0 to about 8.0). Amine salts that are acidic or basic (i.e., have pH's less than about 6.0 or greater than about 8.0) will not provide pigmentary titanium dioxide particles having the reduced water adsorption and improved dispersibility characteristics possessed by the pigmentary titanium dioxide particles of this invention.

The amount of the amine salts added to or formed in situ and deposited on the surface of the titanium dioxide pigment will range from about 0.01 to about 3.0 weight percent based on the weight of the pigment. Preferred amounts range from about 0.1 to about 3.0 weight percent.

In a preferred embodiment of this invention, the titanium dioxide pigments to which the amine salts described hereinabove can be applied will be those pigments upon which has been deposited one or more coatings of a hydrous oxide of a metal selected from the group consisting of aluminum, titanium, zirconium, cerium silicon, zinc, and the like. Methods for depositing such hydrous metal oxide coatings upon bare titanium dioxide pigments are well known. While such methods may vary with respect to the particular processing conditions employed, most of these methods utilize similar procedures for forming the coating of the hydrous metal oxide on the pigment particles. Thus, in general, a water soluble salt or compound of aluminum, titanium, zirconium, cerium, silicon, zinc, and the like is first mixed with an aqueous dispersion or solution of the titanium dioxide pigment to be coated. After addition of the water soluble salt or compound the pH of the aqueous dispersion or solution is altered to effect the precipitation of the desired hydrous metal oxide onto the pigment. When the added water soluble salt or compound produces an acid pH condition in the aqueous dispersion or solution of the pigment then it is necessary to alter this pH by the addition of an alkali to effect precipitation of the hydrous metal oxide. When the added water soluble salts or compounds produce an alkaline pH then it is necessary to add an acid to produce the desired precipitation. However, in these methods it is possible to employ acid reacting and basic reacting water soluble salts or compounds to effect the desired precipitation thereby eliminating the need for any separate addition of acids or alkali.

Generally, in applying a coating of a hydrous metal oxide to the titanium dioxide pigment any water soluble hydrolysable salt may be used to provide the coating of the hydrous metal oxide. Thus, salts such as aluminum sulfate, aluminum nitrate, titanium sulfate, titanium tetrachloride, zirconium sulfate, cerium sulfate and zinc sulfate can be employed. Alkali metal aluminates may be employed in place of the water soluble aluminum salts. Generally, hydrous silicon oxide or silica coatings are provided through the use of water soluble silicates such as the alkali metal silicates as represented by sodium silicate.

The above described general methods for applying hydrous metal coatings to the titanium dioxide pigment, and which methods do not form any part of the present invention, can be carried out either in a batchwise manner or continuously. In a continuous operation, the water soluble salts or compounds of one or more of the metals of aluminum, titanium, zirconium, cerium, silicon, zinc, and the like will be added to a continuous flowing stream of the aqueous dispersion of the titanium dioxide pigment.

The amount of the hydrous metal oxide or oxides deposited onto the titanium dioxide pigment can vary over a wide range, but usually will be at least about 0.05 weight percent and can be up to about 15 weight percent. A more preferred range for the amounts of the hydrous metal oxide or oxides deposited on the pigment will range from about 0.5 weight percent to about 10 weight percent based on the weight of the pigment.

Most preferred titanium dioxide pigments for use in preparing the improved titanium dioxide pigments of this invention are those titanium dioxide pigments having deposited thereon one or more hydrous metal oxides selected from the group consisting of alumina, silica and titanium oxides.

As noted throughout this disclosure, the amine salts described hereinabove are capable of providng titanium dioxide pigments chracterized by increased dispersibility and gloss developing properties in surface coating vehicles and reduced tendencies to adsorb moisture. The magnitude of the increases in dispersibility and gloss developing properties and reduction in water adsorption is significant, particularly when compared to untreated pigment or pigment treated with more conventional materials, e.g., polyols such as trimethylolethane.

However, the greatest benefit provided by the titanium dioxide pigments of this invention is in their significantly improved dispersibility in surface coating vehicles. In this regard, generally 0.001 weight percent or less and more usually 0.0007 weight percent or less of the pigments of this invention can be removed from surface coating vehicles containing them when such vehicles are subjected to filtration through a 12 mesh cloth screen filter cone. By contrast, when surface coating vehicles containing untreated pigment or pigment treated with more conventional materials such as polyols are similarly filterd, as much as 0.026 weight percent or more and as much as 1.0 weight percent or more of these respective pigments can be removed from such vehicles.

The invention is further described and illustrated by the examples which follow. The examples represent specific embodiments of the invention and are not to be construed as limitations thereon.

EXAMPLES 1-7

Examples 1-7 are finished pigment samples representative of the improved titanium dioxide pigment of the present invention. In general, each of Examples 1-7 was prepared by first blending a particular preformed amine salt solution as disclosed herein with a particular commercially produced titanium dioxide base pigment, i.e., a pigment having deposited thereon coatings of one or more hydrous metal oxides and requiring final milling and classification. Each of the resulting pigment/amine salt blends was subjected to fluid energy milling to provide the finished pigments comprising Examples 1-7.

In particular, each of the Examples was prepared from a titanium dioxide base pigment which was crushed and then screened through a 10 mesh wire screen (0.065 inch openings) to obtain a uniform sample thereof. To the uniform sample was added a preformed amine salt solution prepared by combining a polyprotic acid or a polyprotic acid anhydride and an alkanol amine in water. The acid or acid anhydride and the amine were combined and reacted at ambient temperatures and in such proportions to provide an amine salt having an essentially neutral pH. In each instance, the preformed amine salt solution was added to and blended with the uniform pigment sample undergoing treatment in an amount sufficient to yield a 0.25 weight percent concentration of the amine salt on the pigment. The treated pigments then were subjected to a final size reduction in a fluid energy mill utilizing steam as the suspending and carrier gas for the treated pigments. The specific nature of the titanium dioxide base pigment and amine salt employed in preparing each of the pigments of Examples 1-7 are set forth in the Table below.

Each of the finished pigment samples of Examples 1–7 was tested to determine one or more of the water adsorption and dispersibility characteristics thereof and the gloss values of films containing said pigment samples. Water adsorption was determined by equilibrating small quantities of each of the finished pigment samples at 73° F. (23° C.) and 50 percent relative humidity in a constant temperature and humidity room for a period of 24 hours and measuring the weight gain of the sample.

The dispersibility of each of the finished pigment samples was determined in an alkyd paint formulation. In this test, 763 grams of the pigment to be tested were combined with a millbase comprising 206 grams of an alkyd resin, 45 grams of mineral spirits and 14 grams of lecithin in a Hockmeyer disperser. Blending of the pigment and millbase mixture were carried out at a disperser speed sufficient to obtain a roll to the mixture which was maintained until an endpoint temperature of 130° F. (54° C.) was reached. The mixture was let down by adding thereto 6 grams of an anti-skinning agent, an additional 106 grams of mineral spirits and an additional 120 grams of the alkyd resin. The entire mixture then was filtered through a 44"×36" Gardco cone filter (about 12 mesh) and the residue remaining on the filter washed with mineral spirits and dried. For the purposes of this test the less the amount of residue left on the filter, the greater is the dispersibility of the pigment.

The gloss characteristics of films containing the finished pigments of Examples 1–7 were determined using a standard acrylic paint formulation. This formulation was prepared by combining, in a sealable container, 5.0 grams of the finished pigment to be tested, 21.5 grams of an acrylic resin, 2.8 grams of Santicizer 160 (available from the Monsanto Company), 0.7 grams of methyl n-amyl ketone, 0.4 grams of Ektasolve EB acetate (available from the Eastman Kodak Company), 0.7 grams of methyl ethyl ketone and 0.7 grams of toluene. In addition, 20.0 grams of No. 203 glass beads were added to the above formulation and the entire mixture mechanically shaken for thirty minutes. A three mil thick film of this formulation was applied to a clean glass plate and air dried for one hour. The gloss values of the films prepared in the above manner were determined using a 20° gloss meter.

Data obtained for the water adsorption, dispersibility and 20° gloss characteristics of each of the finished pigments of Examples 1–7 are set forth in the Table below. In addition, data for four control examples, i.e., Examples A, B, C and D, are included for comparative purposes.

improved dispersibility of these pigments in surface coating vehicles. This is made particularly clear when the data for Examples 1–7 is compared to that for untreated pigment (Example A) and pigment treated with more conventional or known agents, e.g., trimethylolethane (Examples B and C) and triethanolamine benzoate (Example D). Furthermore, when the gloss value data is compared, it is evident that the amine salt treated pigments of this invention provide films having significantly better gloss than films containing the untreated pigment and provide films of at least equivalent gloss compared to films containing trimethylolethane and triethanolamine benzoate treated pigment.

While this invention has been described and illustrated by the Examples shown, other variations may be employed within the scope of the following claims.

What is claimed is:

1. Titanium dioxide pigments having improved gloss developing and dispersibility properties in surface coating vehicles and reduced tendencies to adsorb moisture, said pigments comprising pigmentary titanium dioxide particles having deposited thereon a treating agent comprising at least one amine salt of a polyprotic acid having a $pK_{a1}$ value greater than about 2.5 and a water solubility at 20° C. of at least 2.0 weight percent and an alkanol amine corresponding to the general formula

wherein $R_1$, $R_2$, and $R_3$ represent hydrogen, unsubstituted hydrocarbon radicals and hydrocarbon radicals substituted with at least one substituent group selected from amino and hydroxyl groups, at least one of said $R_1$, $R_2$, and $R_3$ being a hydrocarbon radical substituted with a hydroxyl group, and having a $pK_{b1}$ value greater than about 4.4, said amine salt having a pH ranging from about 6.0 to about 8.0.

2. The pigments of claim 1 wherein said treating agent comprises an amine salt of a polyprotic acid selected from the group consisting of aliphatic, alicyclic and aromatic polycarboxylic acids and boric acid.

3. The pigments of claim 2 wherein said treating agent comprises an amine salt of a polyprotic acid selected from the group consisting of aliphatic, alicyclic an aromatic polycarboxylic acids containing from 2 to 3 carboxyl groups.

4. The pigments of claim 3 wherein said acid is an

TABLE

| Example No. | Hydrous Oxide on Pigment | | Amine Salt Added | Dispersibility Wt. of Residue gms | Moisture Adsorption % | Gloss @ 20° |
|---|---|---|---|---|---|---|
| | SiO$_2$ | Al$_2$O$_3$ | | | | |
| 1 | — | x | Triethanolamine succinate | 0.0046 | 0.585 | 57 |
| 2 | — | x | Triethanolamine trimellitate | 0.0046 | ND$^{(a)}$ | 55 |
| 3 | — | x | Triisopropanolamine succinate | 0.0056 | ND | 60 |
| 4 | — | x | Triethanolamine malonate | 0.0016 | 0.595 | ND |
| 5 | — | x | Triethanolamine phthalate | 0.0047 | 0.595 | ND |
| 6 | — | x | Triethanolamine borate | 0.0043 | 0.595 | ND |
| 7 | x | x | Triethanolamine succinate | 0.0036 | ND | 48 |
| A | — | x | None (control) | 0.2060 | 0.720 | 38 |
| B | — | x | Trimethylol ethane (control) | 0.0555 | 0.665 | 59 |
| C | x | x | Trimethylol ethane (control) | 0.1134 | ND | 52 |
| D | — | x | Triethanolamine benzoate (control) | 0.0110 | 0.575 | 56 |

$^{(a)}$ND — not determined

The above data relating to Examples 1–7 amply demonstrate the reduced tendency of the titanium dioxide pigments of this invention to adsorb moisture and the aliphatic polycarboxylic acid selected from the group consisting of saturated, straight-chain aliphatic dicarboxylic acids containing from 3 to 10 total carbon atoms.

5. The pigments of claim 4 wherein said saturated, straight-chain aliphatic dicarboxylic acids contain from 3 to 4 total carbon atoms.

6. The pigments of claim 1 wherein said treating agent comprises an amine salt of an alkanol amine corresponding to the general formula

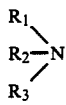

wherein $R_1$, $R_2$, and $R_3$ represent unsubstituted hydrocarbon radicals and hydrocarbon radicals substituted with a substituent selected from the group consisting of amino and hydroxyl groups at least one of said $R_1$, $R_2$, and $R_3$ being a hydrocarbon radical substituted with a hydroxyl group.

7. The pigments of claim 6 wherein said unsubstituted and substituted hydrocarbon radicals represented by $R_1$, $R_2$, and $R_3$ in said general formula are selected from the group consisting of saturated straight- and branched-chain alkyl radicals, cycloalkyl radicals, and aromatic radicals.

8. The pigments of claim 7 wherein said unsubstituted and substituted hydrocarbon radicals represented by $R_1$, $R_2$, and $R_3$ are saturated, straight- and branched-chain alkyl radicals.

9. The pigments of claim 8 wherein each of $R_1$, $R_2$, and $R_3$ are saturated straight- and branched-chain lower alkyl radicals substituted with hydroxyl groups.

10. The pigments of claim 1 wherein said amine salt treating agent is deposited on said pigment in an amount ranging from about 0.01 to about 3.0 weight percent based on the weight of said pigment.

11. The pigments of claim 10 wherein the amount of said amine salt treating agent deposited on said pigment ranges from about 0.1 to about 3.0 weight percent based on the weight of said pigment.

12. The pigments of claim 1 further having deposited thereon at least one hydrous metal oxide selected from the group consisting of alumina, silica, and titania oxides in an amount ranging from about 0.5 to about 10.0 weight percent based on the weight of said pigment.

13. Titanium dioxide pigments having improved gloss developing and dispersibility properties in surface coating vehicles and reduced tendencies to adsorb moisture said pigments comprising pigmentary titanium dioxide particles having deposited thereon from about 0.01 to about 3.0 weight percent, based on the weight of said pigment, of a treating agent comprising at least one amine salt of an aliphatic polycarboxylic acid selected from the group consisting of saturated, straight-chain aliphatic dicarboxylic acids containing from 3 to 10 total carbon atoms said acids being characterized by having $pK_{a1}$ values greater than about 2.5 and a water solubility at 20° C. of at least 2.0 weight percent and an alkanol amine corresponding to the general formula

wherein $R_1$, $R_2$, and $R_3$ represent unsubstituted hydrocarbon radicals and hydrocarbon radicals substituted with a substituent selected from the group consisting of amino and hyroxyl groups, at least one of said $R_1$, $R_2$, and $R_3$ being a hydrocarbon radical substituted with a hydroxyl group, said hydrocarbon radicals being selected from the group consisting of straight- and branched-chain alkyl radicals, cycloalkyl radicals and phenyl radicals and wherein said alkanol amines have $pK_{b1}$ values greater than about 4.4.

14. The pigments of claim 13 wherein said saturated, straight-chain aliphatic dicarboxylic acids contain from 3 to 4 total carbon atoms.

15. The pigments of claim 14 wherein said unsubstituted and substituted hydrocarbon radicals represented by $R_1$, $R_2$, and $R_3$ are saturated, straight- and branched-chain alkyl radicals.

16. The pigments of claim 15 wherein each of $R_1$, $R_2$, and $R_3$ are saturated, straight- and branched-chain lower alkyl radicals substituted with hydroxyl groups.

17. The pigments of claim 13 further having deposited thereon at least one hydrous metal oxide selected from the group consisting of alumina, silica and titania oxides in an amount ranging from about 0.5 to about 10.0 weight percent based on the weight of said pigment.

18. The pigments of claim 13 wherein the amount of said amine salt treating agent deposited on said pigment ranges from about 0.1 to about 3.0.

* * * * *